United States Patent
Volovec (10) Patent No.: US 10,982,784 B2
(45) Date of Patent: Apr. 20, 2021

(54) ACTUATOR FOR CONTROLLING A VALVE

(71) Applicant: IMI HYDRONIC ENGINEERING INTERNATIONAL SA, Eysins (CH)

(72) Inventor: Peter Volovec, Kapele (SI)

(73) Assignee: IMI HYDRONIC ENGINEERING INTERNATIONAL SA, Eysins (CH)

( * ) Notice: Subject to any disclaimer, the term of this patent is extended or adjusted under 35 U.S.C. 154(b) by 23 days.

(21) Appl. No.: 15/763,990

(22) PCT Filed: Jun. 1, 2016

(86) PCT No.: PCT/EP2016/062414
§ 371 (c)(1),
(2) Date: Mar. 28, 2018

(87) PCT Pub. No.: WO2017/054940
PCT Pub. Date: Apr. 6, 2017

(65) Prior Publication Data
US 2018/0283574 A1    Oct. 4, 2018

(30) Foreign Application Priority Data

Oct. 1, 2015    (EP) .................................... 15187901

(51) Int. Cl.
*F16K 31/50*    (2006.01)
*F16K 35/06*    (2006.01)
(Continued)

(52) U.S. Cl.
CPC ............ *F16K 31/05* (2013.01); *F16K 31/508* (2013.01); *F16K 35/027* (2013.01); *F16K 35/06* (2013.01); *F16K 35/10* (2013.01); *F16K 31/504* (2013.01)

(58) Field of Classification Search
CPC ...... F16K 31/05; F16K 31/055; F16K 31/504; F16K 31/508; F16K 35/027; F16K 35/06; F16K 35/10
(Continued)

(56) References Cited

U.S. PATENT DOCUMENTS 1,716,277 A * 6/1929 Messmer .................. F16K 1/22
251/96
2,327,980 A * 8/1943 Bryant .................... F16D 21/02
192/48.9
(Continued)

FOREIGN PATENT DOCUMENTS

CN    1789770 A    6/2006
CN    1835811 A    9/2006
(Continued)

OTHER PUBLICATIONS

International Search Report (PCT/ISA/210) dated Jul. 12, 2016, by the European Patent Office as the International Searching Authority for International Application No. PCT/EP2016/062414.
(Continued)

*Primary Examiner* — Matthew W Jellett
*Assistant Examiner* — Jonathan J Waddy
(74) *Attorney, Agent, or Firm* — Buchanan Ingersoll & Rooney P.C.

(57) ABSTRACT

An actuator for controlling a valve having a valve rod is provided. The actuator includes a manual override arrangement for manually moving the actuator spindle, the manual override arrangement including a locking element, an actuator spindle holder housing at least a portion of an actuator spindle. A guiding arrangement is adapted to guide the actuator spindle along the actuator spindle holder. In a normal operating mode the actuator spindle holder is locked to the locking element, and the actuator spindle is guidable (Continued)

along the actuator spindle holder via the guiding arrangement. In a manual override operating mode, the actuator spindle holder is unlocked from the locking element, and the actuator spindle holder is rotatable together with the actuator spindle via the guiding arrangement.

16 Claims, 7 Drawing Sheets

(51) Int. Cl.
*F16K 35/10* (2006.01)
*F16K 31/05* (2006.01)
*F16K 35/02* (2006.01)

(58) Field of Classification Search
USPC ............... 251/129.03, 96, 97; 137/384.8
See application file for complete search history.

(56) References Cited

U.S. PATENT DOCUMENTS

| | | | | |
|---|---|---|---|---|
| 3,010,693 A * | 11/1961 | Lamar | ............ | F16K 35/027 251/96 |
| 3,193,243 A * | 7/1965 | Billington | ............ | F16K 31/047 251/96 |
| 3,515,250 A * | 6/1970 | Cantalupo | ............ | F16D 21/02 192/114 R |
| 3,976,279 A | 8/1976 | Walker et al. | | |
| 4,393,965 A * | 7/1983 | Zouzoulas | ............ | F16D 21/02 192/114 R |
| 4,474,078 A * | 10/1984 | Denkowski | ............ | F16K 31/05 192/35 |
| 5,037,066 A * | 8/1991 | Kerger | ............ | F16K 35/027 188/82.9 |
| 5,490,660 A * | 2/1996 | Kamezawa | ............ | F16K 35/027 251/96 |
| 6,315,264 B1 * | 11/2001 | Baker | ............ | F16K 31/122 251/14 |
| 8,544,817 B2 * | 10/2013 | Liccardi | ............ | F16K 31/055 137/556 |
| 2004/0026175 A1 | 2/2004 | Oh et al. | | |
| 2005/0012064 A1 * | 1/2005 | Lay | ............ | F16D 11/10 251/249.5 |
| 2008/0315139 A1 * | 12/2008 | Stone | ............ | F16K 31/05 251/129.03 |
| 2009/0039304 A1 * | 2/2009 | Ishihara | ............ | F16K 31/50 251/264 |
| 2015/0147955 A1 | 5/2015 | Yoskowitz | | |

FOREIGN PATENT DOCUMENTS

| | | |
|---|---|---|
| CN | 201496645 U | 6/2010 |
| CN | 101988599 A | 3/2011 |
| CN | 203051908 U | 7/2013 |
| CN | 203560558 U | 4/2014 |
| DE | 2 310 200 B1 | 6/1974 |
| EP | 1 079 159 A1 | 2/2001 |
| EP | 2 725 267 A1 | 4/2014 |
| WO | 2007/130041 A1 | 11/2007 |
| WO | 2013/177166 A1 | 11/2013 |

OTHER PUBLICATIONS

Written Opinion (PCT/ISA/237) dated Jul. 12, 2016, by the European Patent Office as the International Searching Authority for International Application No. PCT/EP2016/062414.
Office Action (The First Office Action) dated Feb. 3, 2019, by the State Intellectual Property Office of the People's Republic of China in corresponding Chinese Patent Application No. 201680057612.1, and an English Translation of the Office Action. (18 pages).

* cited by examiner

ACTUATOR FOR CONTROLLING A VALVE

TECHNICAL FIELD OF THE INVENTION

The present invention relates to an actuator for controlling a valve having a valve rod.

BACKGROUND OF THE INVENTION

Fluid distribution systems, for e.g. heating, cooling and water supply are designed to feed a fluid from a source to a consumption point. Each consumption point typically has a calculated and designed flow or differential pressure requirement. However, depending on the type of hydronic system, the flow requirement is often variable over time and can change with factors like seasonality (e.g. summer or winter), that changes the load from the consumption points, temperature changes of the system fluid, changes in consumption of the system fluid (e.g. for drinking water).

Control valves are frequently used in fluid distribution systems and have a variable opening such that the flow rates can be controlled. An actutator for controlling the position of such a valve is often provided. Such an actuator is normally driven by means of a motor which drives an actuator spindle. The actuator spindle is in turn connected to a valve rod for controlling the opening degree of the valve. In some instances, such as before the actuator has been connected to the grid or during installation, it may be desirable to manually override the normal operating mode, by disconnecting the motor-driven operation of the actuator spindle and instead allowing for manual drive of the the actuator spindle. Therefore, some actuators are provided with manual override mechanisms.

Although existing manual override mechansims serve their purpose, it would be desirable to provide a manual override mechanism which is compact and yet reliable.

SUMMARY OF THE INVENTION

An object of the present invention is to provide an actuator which has a compact and reliable manual override arrangement. This and other objects, which will become apparent in the following, are accomplished by an actuator defined in the appended claims.

The present inventive concept is based on the insight that an actuator spindle may obtain a non-rotary axial motion in a motor driven normal operating mode, and a rotary and axially advancing motion in a manual override operating mode. These two different ways of advancing an actuator spindle can be accomplished in a compact fashion. In particular the inventors have realized that in the normal operating mode, the actuator spindle may be displaced along an actuator holder which at least partly houses the actuator, while in the manual override operating mode, the actuator spindle may be rotated together with the actuator spindle holder so as to axially advance the two components simultaneously. Furthermore, it has been realized that an actuator may be switched from normal operating mode to a manual override operating mode by releasably locking an actuator spindle holder, in such way that an actuator spindle housed in the actuator spindle holder is prevented from rotating in the normal operating mode and only perform an axial movement in the actuator spindle holder based on a motor drive, and being rotatingly advancable together with the actuator spindle holder in the manual override operating mode when the latter is released from the locked state. The locking and unlocking of the actuator spindle holder may, for instance, be accomplished by means of a slight axial movement of the actuator spindle holder.

According to an aspect of the inventive concept, an actuator is provided for controlling a valve having a valve rod, said actuator comprising:
a housing;
an actuator spindle arranged at least partly inside said housing, said actuator spindle being arranged to control the movement of a valve rod;
a manual override arrangement for manually moving said actuator spindle, said manual override arrangement comprising:
a locking element,
an actuator spindle holder housing at least a portion of said actuator spindle, and
a locking arrangement having a first engaging portion comprised in said locking element and a second engaging portion comprised in said actuator spindle holder, said second engaging portion being arranged to engage with said first engaging portion,
a guiding arrangement for guiding the actuator spindle, said guiding arrangement having first guiding means comprised in said actuator spindle holder, and second guiding means comprised in said actuator spindle,
such that in a normal operating mode of said actuator, said first engaging portion engages with said second engaging portion whereby said actuator spindle holder is locked to said locking element, and said actuator spindle is guidable along said actuator spindle holder via said guiding arrangement;
wherein in a manual override operating mode, said second engaging portion is disengaged from said first engaging portion whereby said actuator spindle holder is unlocked from said locking element, and said actuator spindle holder is rotatable together with said actuator spindle via said guiding arrangement.

In the normal operating mode, the first engaging portion and the second engaging portion rotationally lock the actuator spindle holder, however, in some example embodiments it is conceivable that the engaging portions also provide axial locking of the actuator spindle holder.

The first engaging portion and the second engaging portion are releasable from each other, i.e. from their engaged state. Thus, the actuator spindle holder is releasably lockable to the locking element. In other words, said locking element prevents movement of said actuator spindle holder when said first engaging portion engages with said second engaging portion. The actuator spindle holder may, for instance, be released from the locking element by moving one of the two components axially away from the other. For example, the first and second engaging portions may have mutually matching teeth which when moved axially become disengaged. Suitably, the actuator holder spindle is moved away from the locking portion and in an axial direction towards the valve rod. Thus, in one exemplary embodiment, the actuator spindle holder is unlocked/disengaged (in the manual override operating mode) from the locking element by an axially separating movement of either one of the two. Axially separating movement is in this instance considered to be along a direction parallel to the longitudinal extension of the actuator spindle.

According to at least some example embodiment, the actuator spindle holder may be disengaged from the locking element (thus changing the operating mode of the actuator form normal to manual override operating mode) in different conceivable ways. Suitably, an axial disengaging movement of the actuator spindle holder may be achieved by applying an axially directed pushing force onto the actuator spindle holder. The movement of the actuator spindle holder may be directly or indirectly controlled. If the movement of the actuator spindle holder is indirectly controlled it may for instance be via a movement of a tool-receiving element, as will be exemplified later in this disclosure. Furthermore, a downwardly directed pushing force on the actuator spindle holder may also be achieved directly or indirectly. For instance, an element may be moved in a non-axial direction but the movement of said element may transmit an axially directed pushing force which is applied directly or indirectly to the actuator spindle holder. This will also be exemplified in more detail later in this disclosure.

The first engaging portion comprised in said locking element may be provided on a surface of the locking element which is an inner and/or lower surface. The second engaging portion comprised in said actuator spindle holder may be provided on a surface of the actuator spindle holder which is an outer and/or upper surface.

According to at least one example embodiment said first engaging portion comprised in said locking element comprises teeth and said second engaging portion comprised in said actuator spindle holder comprises matching teeth. Such mutually matching or engaging teeth may in some embodiments be axially extending from the respective component, and in other embodiments the mutually matching teeth may be radially extending from the respective component. Other ways to rotationally lock the actuator spindle holder is also conceivable. For instance, instead of teeth, the actuator spindle holder could have an outer polygonal surface which can become rotationally locked by a corresponding polygonal inner surface of the locking element.

According to at least one example embodiment, the actuator comprises a spring element arranged to press said second engaging portion comprised in said actuator spindle holder towards said first engaging portion comprised in said locking element.

The locking element is suitably arranged internally of the housing of the actuator, and is e.g. attached to a fundament or a base portion inside said housing. This is reflected in at least one example embodiment, according to which the actuator comprises a base portion provided at least partly inside of said housing, wherein said locking element is attached to said base portion inside said housing, wherein a spring element is provided between said base portion and said actuator spindle holder, the spring element being biased to press said second engaging portion comprised in said actuator spindle holder towards said first engaging portion comprised in said locking element. Suitably, the locking element is fixed to the base portion so that the locking element cannot rotate relative to the base portion.

According to at least one example embodiment, the actuator spindle has a main extension in an axial direction, wherein said first engaging portion comprised in said locking element is arranged on a surface being perpendicular to said axial direction, and said second engaging portion comprised in said actuator spindle holder is arranged on a surface being perpendicular to said axial direction. As mentioned above, the first engaging portion may be provided on an inner and/or lower surface of the locking element, while the second engaging portion may be provided on an outer and/or upper surface of the actuator spindle holder.

According to at least one example embodiment, said locking element is arranged radially outwardly and co-axially with said actuator spindle holder.

According to at least one example embodiment, the actuator comprises a main drive gear having a through hole with an internal thread, wherein said actuator spindle comprises a matching external thread and is adapted to be guided in and along said through hole of the main drive gear.

In the normal operating mode when the main drive gear rotates, the internal thread of the main drive gear will also rotate and will due to the engagement with the matching external thread of the actuator spindle cause the actuator spindle to move axially. This axial movement of the actuator spindle may be accomplished without rotating the actuator spindle around its own axis. In particular, if the actuator spindle is rotationally, but not axially, locked to an actuator spindle holder, and the actuator spindle holder is in an unmovable state locked by the locking element, then the actuator spindle will travel along the actuator spindle holder in its axial direction.

In the manual override operating mode when the main gear does not rotate, a rotating movement of the unlocked actuator spindle holder will cause the actuator spindle to rotate and due to the cooperating threads the actuator spindle will advance along the through hole of the main drive gear, similarly to a threaded screw or bolt being rotated through a threaded stationary nut.

Thus, according to at least one example embodiment, in the normal operating mode, a rotation of the main drive gear results in an axial movement of the actuator spindle, while in the manual override operating mode, a rotation of the actuator spindle results in an axial movement of the actuator spindle.

According to at least one example embodiment, said guiding arrangement comprises a male-female coupling. In particular said first and second guiding means may be a male-female coupling, such as a pin or projection being guided in an elongated groove, or conversely, a notch being guided by an elongated ridge.

Thus, according to at least one example embodiment, said guiding arrangement comprises:

an elongated groove provided in an inner surface of said actuator spindle holder, and a pin provided on an outer surface of said actuator spindle, said pin being adapted to protrude into said elongated groove in order to guide said actuator spindle along said elongated groove.

In other conceivable embodiments, the elongated groove may be provided in an outer surface of the actuator spindle and the pin may be provided on the inner surface of the actuator spindle holder.

Furthermore, in any one of the above embodiments it is conceivable to have more than one pin and one matching groove, e.g. two or more pins guided in respective grooves.

Suitably, the actuator spindle holder and the actuator spindle are rotationally locked relative to each other in both the normal operating mode and in the manual override operating mode. In other words, by controlling the actuator spindle holder, the actuator spindle can also be controlled. The constant rotational locking between the actuator spindle and the actuator spindle holder may, for instance, be achieved by the above exemplified pin/groove interaction.

According to at least one example embodiment, said actuator spindle holder is arranged radially outwardly and co-axially with said actuator spindle.

Suitably, the actuator spindle holder partly encloses the actuator spindle, e.g. about 10-60% of the length of the actuator spindle is enclosed.

According to at least one example embodiment, said manual override arrangement further comprises a tool-receiving element adapted to receive a tool, said tool-receiving element being operatively connected to said actuator spindle holder, and in said manual override operating mode, being rotatably movable together with said actuator spindle holder.

When the actuator spindle holder is unlocked from the locking element to put the actuator into the manual override operating mode, the movement of both the actuator spindle and the actuator spindle holder will typically be a rotational movement, as the rotation of the tool-receiving element will be transferred to a rotation of the actuator spindle holder, and since the actuator spindle and the actuator spindle holder is connected as exemplified above.

As mentioned previously, the actuator spindle may have a main extension in an axial direction of the actuator. According to at least one example embodiment, said tool-receiving element and said actuator spindle holder are adapted to move in said axial direction. In other words, the tool-receiving element and the actuator spindle holder may move together in the axial direction in order to disengage the actuator spindle holder from the locking element or to engage the actuator spindle holder with the locking element.

Suitably, in the normal operating mode, the tool-receiving element is not rotatable, but instead rotationally locked. This means that in the normal operating mode, the actuator spindle which is operatively connected to the tool-receiving element is also rotationally locked relative to its longitudinal axis. In other words, in the normal operating mode, the actuator spindle does not revolve around its own axis.

According to at least one example embodiment, said manual override arrangement further comprises a clutch arrangement arranged between said tool-receiving element and said actuator spindle holder. In other words, said tool-receiving element is operatively connected to said actuator spindle holder via said clutch arrangement. Said clutch arrangement is suitably an overload protection clutch arrangement, such that the rotation movement of the tool-receiving element is only transferred to the actuator spindle holder up to a certain threshold force or torque. For example, if the actuator spindle has reached an end position (such as having pushed the valve rod into a valve seat to close the valve), in order to avoid overloading the actuator spindle by continued rotation thereof, the clutch arrangement will at said threshold force or torque temporarily operatively disengage the tool-receiving element from the actuator spindle holder. This may be achieved, for instance, by a clutch arrangement having first cogs engaging with second cogs, wherein at or above said threshold force or torque the first cogs will pass over the second cogs instead of engaging them in a rotational movement.

According to at least one example embodiment, said tool-receiving element is made in one piece with said actuator spindle holder. However, according to other example embodiments, said tool-receiving element is made as a separate piece. Furthermore, according to at least some example embodiments, said tool-receiving element may be operatively connected to the actuator spindle holder via an intermediate element. The above described clutch arrangement may, for instance, be located at the interface between the actuator spindle holder and the intermediate element.

For instance, according to at least one example embodiment, said manual override arrangement further comprises an intermediate element provided between said tool-receiving element and said actuator spindle holder, wherein said clutch arrangement comprises a first clutch engaging portion comprised in an inner surface of said intermediate element, and a second clutch engaging portion comprised in an outer surface of said actuator spindle holder.

Said inner surface of the intermediate element may suitably enclose said outer surface of the actuator spindle holder, such as two coaxially provided substantially cylindrical surfaces. The first clutch engaging portion may be provided with cogs extending radially inwardly from the inner surface of the intermediate element (i.e. extending in a direction towards the centre/longitudinal axis of the actuator spindle). The second clutch engaging portion may be provided with mating cogs extending radially outwardly from the outer surface of the actuator spindle holder (i.e. extending in a direction away from the centre/longitudinal axis of the actuator spindle).

According to at least one example embodiment, the actuator further comprises a spacer element and a biasing spring arranged between the intermediate element and the actuator spindle holder. Further, the spacer element is preferably provided with an outer clutch engaging portion for engaging the first clutch engaging portion which is provided on the intermediate element, and an inner clutch engaging portion for engaging the second clutch engaging portion which is provided on the actuator spindle holder. The biasing spring is preferably arranged between the spacer element and the actuator spindle holder in order to provide a biasing force on the spacer element. Hereby the spacer element acts as an additional gearing structure which together with the biasing spring facilitates the return of the clutch arrangement and other gears or components of the manual override arrangement when switching from the manual override mode to the normal operating mode, i.e. back to their original position for the normal operating mode. Consequently the risk of having sticking issues when changing from manual override mode to normal operating mode is reduced.

According to at least one example embodiment, the actuator comprises a clutch spring adapted to press said first clutch engaging portion towards said second clutch engaging portion. In other words, the clutch spring is adapted to press a portion of said intermediate element towards a portion of said actuator spindle holder. Thus, if the overload protection is activated so that the mating cogs are temporarily disengaged from each other, the clutch spring is adapted to subsequently bring the cogs back into an engaged position. The actuator spindle holder may then be rotated by rotating the tool-receiving element (unless of course, the force or torque at the clutch arrangement is too high so that the overload protection is again activated).

Thus, from the above it can be understood that, according to at least one example embodiment, said tool-receiving element is adapted to receive and transfer a rotational movement from a tool to said actuator spindle via said intermediate element, said clutch and said actuator spindle holder.

The inventors have further realized that changing from the normal operating mode of the actuator to the manual override mode of the actuator, i.e. unlocking the actuator spindle holder from the locking element, may be achieved by moving a protecting element from a first position to a second position, wherein such movement causes the tool-receiving element and the to move the actuator spindle holder from a locked position (relative to the locking element) to an unlocked position. This movement is suitably in the axial direction of the actuator spindle. This is reflected in at least one example embodiment, according to which said tool-receiving element has a receiving hole for receiving the tool, wherein said manual override arrangement further comprises a protecting element having a through hole for receiving the tool, wherein said protecting element is movable between a first position where said through hole is non-aligned with said receiving hole, and a second position where said through hole is aligned with said receiving hole such that the tool may extend through said through hole and into said receiving hole in order to rotate said tool-receiving element for transferring the rotation to said actuator spindle.

Thus, when the protecting element is in said first position the actuator is in normal operating mode, but when the protecting element is moved to said second position the actuator element is in manual override operating mode. In the misaligned first position the protecting element may protect/cover the receiving hole of the tool-receiving element, thereby avoiding that the actuator spindle holder and the actuator spindle become manipulated by mistake.

According to at least one example embodiment, said protecting element is arranged on the housing of the actuator, and/or is a part of said housing. According to at least one example embodiment said protecting element is a separate part from the housing. In at least some example embodiments, the protecting element may be slidably movable between said first position and said second position. In at least some example embodiments it may be rotatably or pivotably movable between said first position and said second position.

When the through hole of the protecting element is aligned with the receiving hole of the tool-receiving element at least some portions are overlapping enough for a tool to be inserted through both the through hole and the receiving hole. Suitably, in said second position of the protecting element, said through hole is co-axial with the receiving hole, the through hole being axially displaced relative to the receiving hole.

In at least some example embodiments the through hole and the receiving hole have substantially the same diameter. In at least some example embodiments the receiving hole may be smaller than the through hole, as long as the tool can enter into the receiving hole.

The receiving hole may suitably be in the form of a blind hole having some kind of key at the bottom for engaging the received mating tool. The key may, for instance, be polygonal, such as square, hexagonal, or octagonal, or have any other suitable shape, such as star or lobe shape. In at least some example embodiments, rather than just having a bottom for matingly engaging the tool, the entire or at least a portion of the receiving hole may have a cross-section which is complementary to the cross-section of the tool. For instance, the entire receiving hole may have a hexagonal cross-section.

In other example embodiments the receiving hole is not in the form of a blind hole, but may instead be a through passage from one end of the tool-receiving element to the opposite end of the tool-receiving element.

When an operator mates a tool with a tool-receiving portion in the receiving hole, the operator may, by means of the tool, rotate the tool-receiving element around its axis. Thus, in the manual override operating mode, the tool-receiving element is rotatable. Suitably, in the normal operating mode, the tool-receiving element is not rotatable, but instead rotationally locked. Thus, when the protecting element is moved from the first position to the second position, that movement may cause the rotational locking of the tool-receiving element to be released. Although, this may be implemented in differently designed embodiments, such as the movement of the protecting element causing movement of the locking element away from the tool-receiving element, in at least some example embodiments, the movement of the protecting element causes the tool-receiving element to move, and thus causing also the actuator holder to move, since it is operatively connected (directly or indirectly) to the tool-receiving element.

Thus, according to at least one example embodiment, movement of the protecting element from its first position to its second position causes the tool-receiving element to move, whereby the manual override operating mode is established.

From the above, it should now be clear that according to at least one example embodiment, the tool-receiving element is suitably operatively connected to, and is rotatably movable with, said actuator spindle holder, wherein when said protecting element is in its first position, said actuator spindle holder is locked to said locking element, and when said protecting element is in its second position, said tool-receiving element and said actuator spindle holder is moved in such a way that said second engaging portion comprised in said actuator spindle holder is disengaged from said first engaging portion comprised in said locking element whereby said actuator spindle holder is unlocked from said locking element.

Once the manual override operating mode has been established, a user can move the actuator spindle via said tool-receiving element by means of a tool which engages and rotates the tool-receiving element. The tool-receiving element and the actuator spindle holder may in some embodiments be rigidly connected to each other.

According to at least one example embodiment, said protecting element comprises a bevelled surface at least partly facing said tool-receiving element, and wherein said bevelled surface is arranged to move said tool-receiving element as said protecting element is moved from its first to its second position.

The housing may suitably be provided with an indentation or recess, in which the protecting element is arranged. The protecting element may, for instance, be slidable or rotatable in said indentation or recess.

In the first position of the protecting element, a gap may be formed between an outer surface of said tool-receiving element and an inner surface of said protecting element. In the second position of the protecting element the bevelled surface (at the inner surface of the protecting element) may at least partly close the gap by moving, e.g. pushing in the axial direction, said tool-receiving element. Alternatively, in the first position of the protecting element, there may be a slight contact which does not exert a pressing force on the tool-receiving element, while in the second position (similarly to the first alternative) the bevelled surface provides an axial force component to the tool-receiving element. In other words, a non-axial movement of the protecting element may be transferred into an axial movement of the tool-receiving element. For instance, a sliding radial movement (radial in relation to the centre axis of the tool-receiving element) of the protecting element from the first position to the second position will result in an axial movement of the tool-receiving element.

As mentioned previously, according to at least one example embodiment, said protecting element is movable from its first position to its second position by being slidably movable or rotatably movable. This allows a practical protection of the tool-receiving element and its receiving hole. For instance, a user may using his/her thumb or other finger slide the protecting element into the second position to remove the protecting/capping portion of the protecting element and to align the through hole of the protecting element with the receiving hole of the tool-receiving element. At the same time as the access to the receiving hole is obtained the actuator has been placed in manual override operating mode by axial movement of the tool-receiving element, and thus also the actuator spindle. In the manual override operating mode the actuator spindle becomes rotatable. Thus, when an operator rotates the tool-receiving element with a tool, the actuator spindle will be rotated. Such manual rotation of the actuator spindle may cause the actuator spindle to travel in its axial direction by means of an external thread on the actuator spindle cooperating with an internal thread on another component (e.g. internal thread of a drive arrangement component, such as a gear). In normal operating mode, said other component may be rotated such that the actuator spindle is moved axially (without rotation of the actuator spindle) by means of said external thread of the actuator spindle cooperating with the internal thread of said rotating other component.

DETAILED DESCRIPTION OF THE DRAWINGS

The above, as well as additional objects, features and advantages of the present inventive concept, will be better understood through the following illustrative and non-limiting detailed description of example embodiments of the present inventive concept, with reference to the appended drawings where the same reference numerals will be used for similar elements. In the following description, the present inventive concept is described with reference to an actuator for controlling a valve.

Figure 1A:
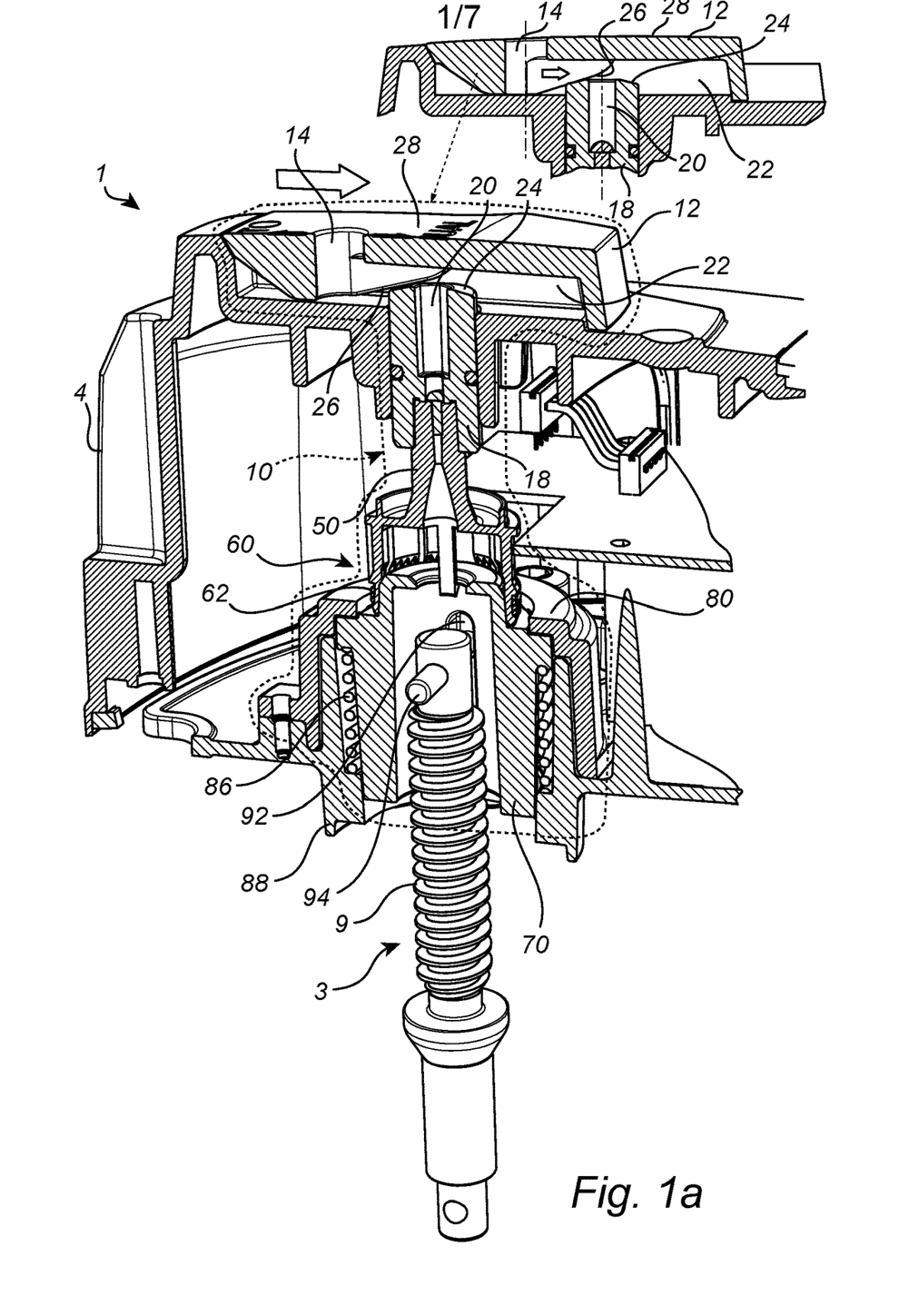
FIG. 1a is a break-away view of parts of an actuator according to at least one example embodiment of the invention, the actuator being in normal operating mode.
Figure 4A:
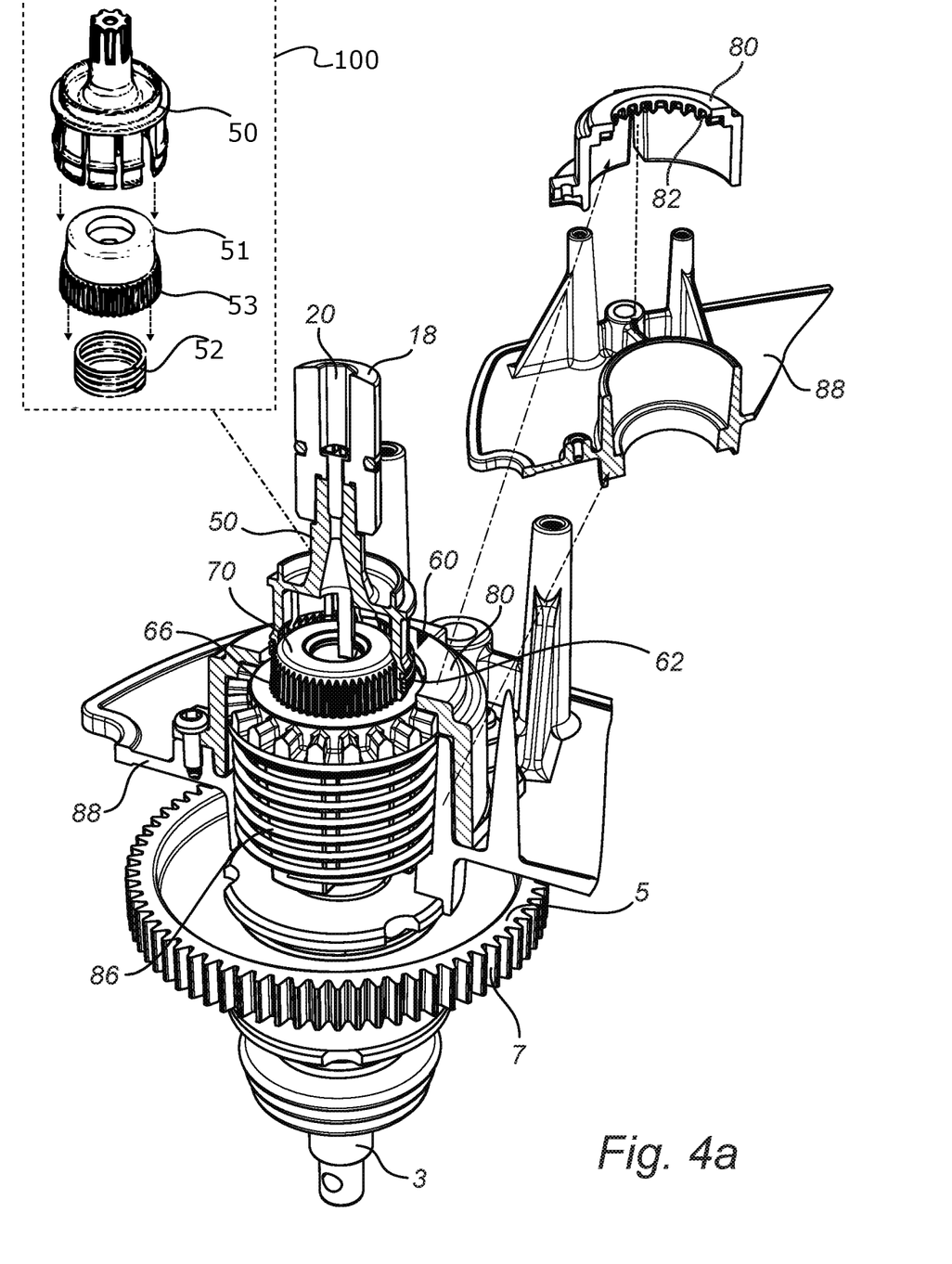
FIG. 4a is a detailed view of other parts of said manual override arrangement of said actuator in FIG. 1a, the actuator being in normal operating mode.
Figure 4B:
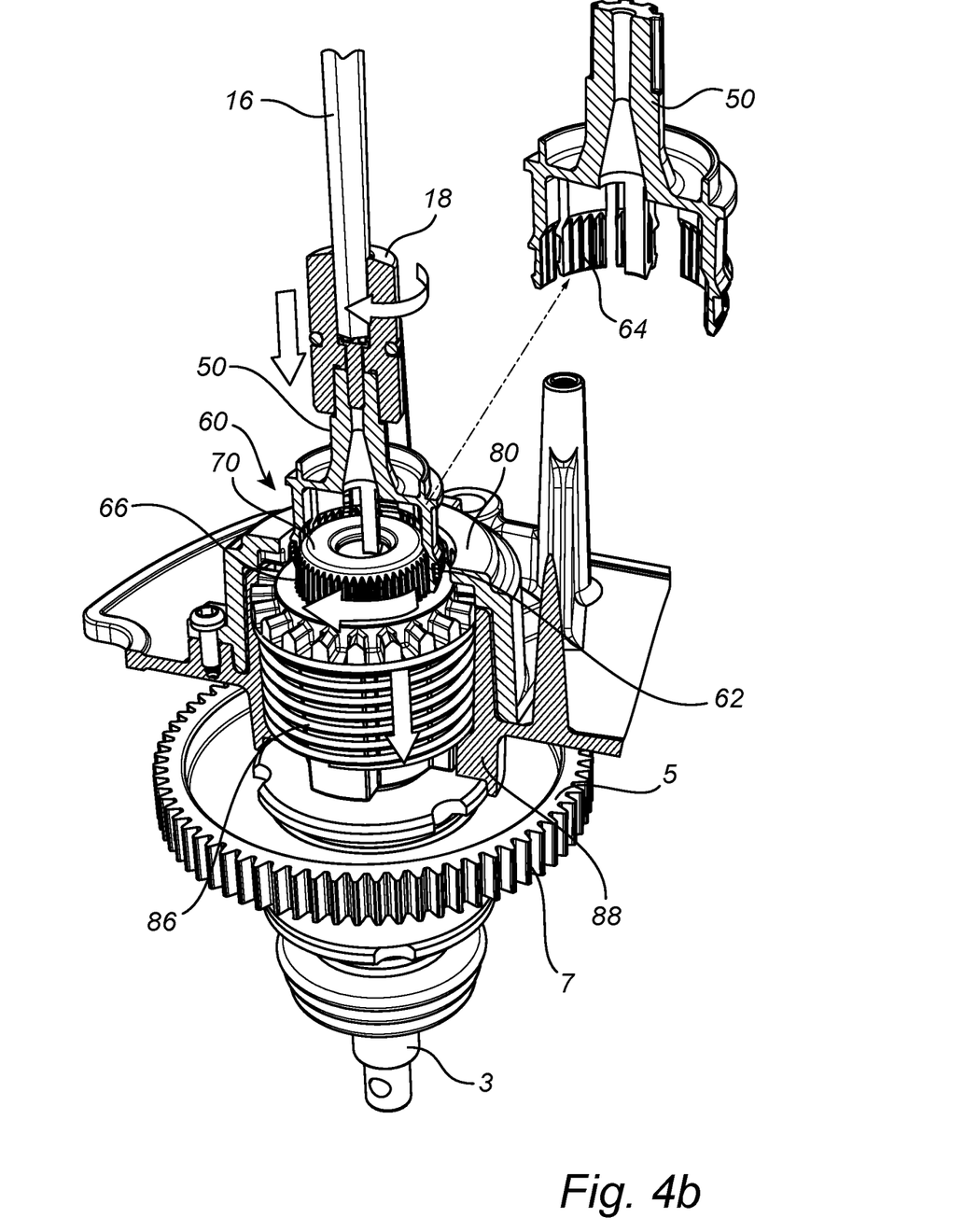
FIG. 4b is a detailed view of said other parts of said manual override arrangement, the actuator being in manual override operating mode.

FIG. 1a illustrates an actuator 1 for controlling a valve having a valve rod. The valve and valve rod, which are not part of the inventive concept, are not shown in the drawings but may be any suitable type of valve for a fluid distribution system. The actuator 1 comprises an actuator spindle 3 arranged at least partly inside an actuator housing 4. The actuator spindle 3 is operatively connected to the valve rod of the valve in order to move the valve rod and thereby varying the opening of the valve. The actuator 1 further comprises a motor (not shown) connected to the actuator spindle 3 via a gear arrangement. A main gear wheel 5 of the gear arrangement is shown in FIGS. 4a and 4b. In normal operating mode, the motor, for example an electrically driven motor, drives the gear arrangement including said main gear wheel 5 which transfers its rotational movement into reciprocal movement of the actuator spindle 3.

Although not illustrated, the gear arrangement may typically comprise a first gear wheel arranged in rotational connection with the motor, said main gear wheel 5 directly connected with the actuator spindle 3, and at least one intermediate gear wheel arranged between the first gear wheel and the main gear wheel 5, the at least one intermediate gear wheel is thus arranged to transfer rotational movement from the first gear wheel to the main gear wheel 5. However, other gear arrangements are also conceivable, e.g. with fewer or more gear wheels.

Figure 1B:
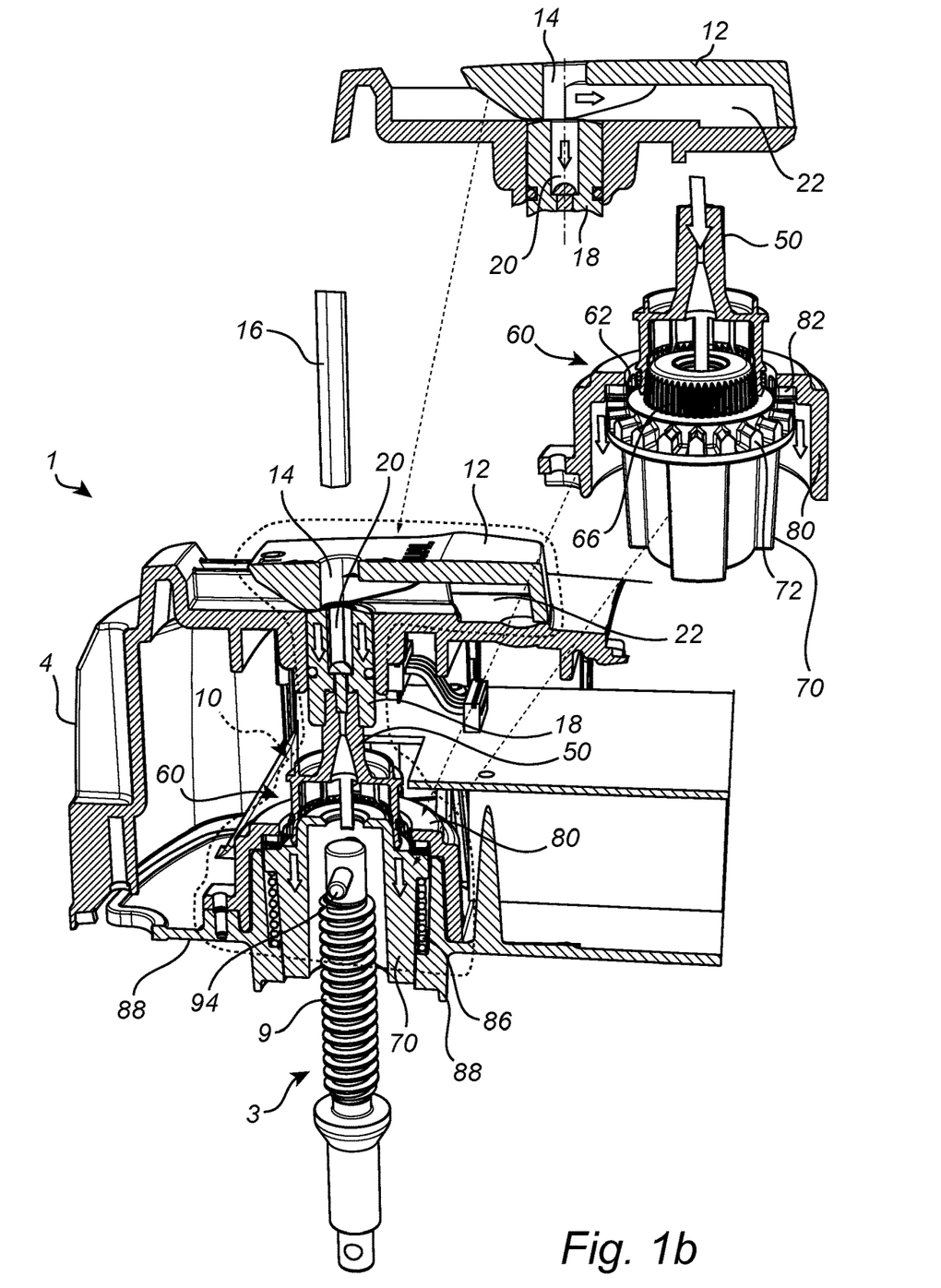
FIG. 1b is a break-away view of parts of said actuator in FIG. 1a, the actuator being in normal operating mode.

The main gear wheel 5 comprises gear teeth 7 arranged on an outer surface of the main gear wheel 5, the gear teeth 7 being arranged for mating with (and being acted upon by) corresponding gear teeth of another gear wheel, such as an intermediate gear wheel as described above. The main gear wheel 5 further comprises an internally arranged thread (not shown) adapted to engage with a matching thread 9 provided externally on the actuator spindle 3 (see FIGS. 1a-2). As the main gear wheel 5 is driven by the motor, it rotates while being locked in the axial position. Thus, the main gear wheel 5 does not move along its central axis. Since the main gear wheel 5 is axially locked, the actuator spindle 3 is moved in the axial direction as the rotational movement of the main gear wheel 5 is transferred to an axial movement of the actuator spindle 3 via the engagement of the internal thread of the main gear wheel 5 and the external matching thread 9 of the actuator spindle 3. In other words, as the main gear wheel 5 rotates while being locked in the axial position, the rotational movement of the internal thread engaging with the external matching thread 9 is transferred into an axial movement of the actuator spindle 3, as the internal thread of the main gear wheel 5 exerts an axial force on the external matching thread 9 of the actuator spindle 3. Thus it should be understood that the internal thread and the external matching thread 9 have a matching lead and pitch.

Figure 3A:
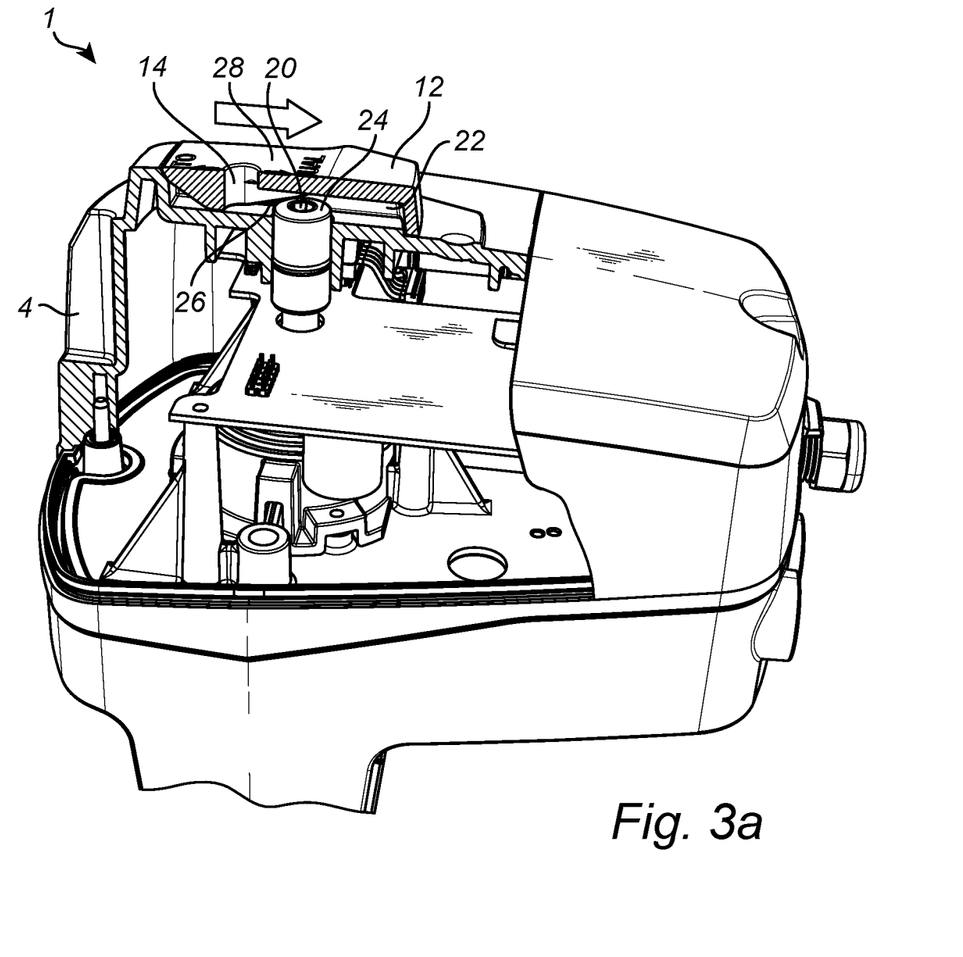
FIG. 3a is a detailed view of parts of a manual override arrangement of said actuator in FIG. 1a, the actuator being in normal operating mode.
Figure 3B:
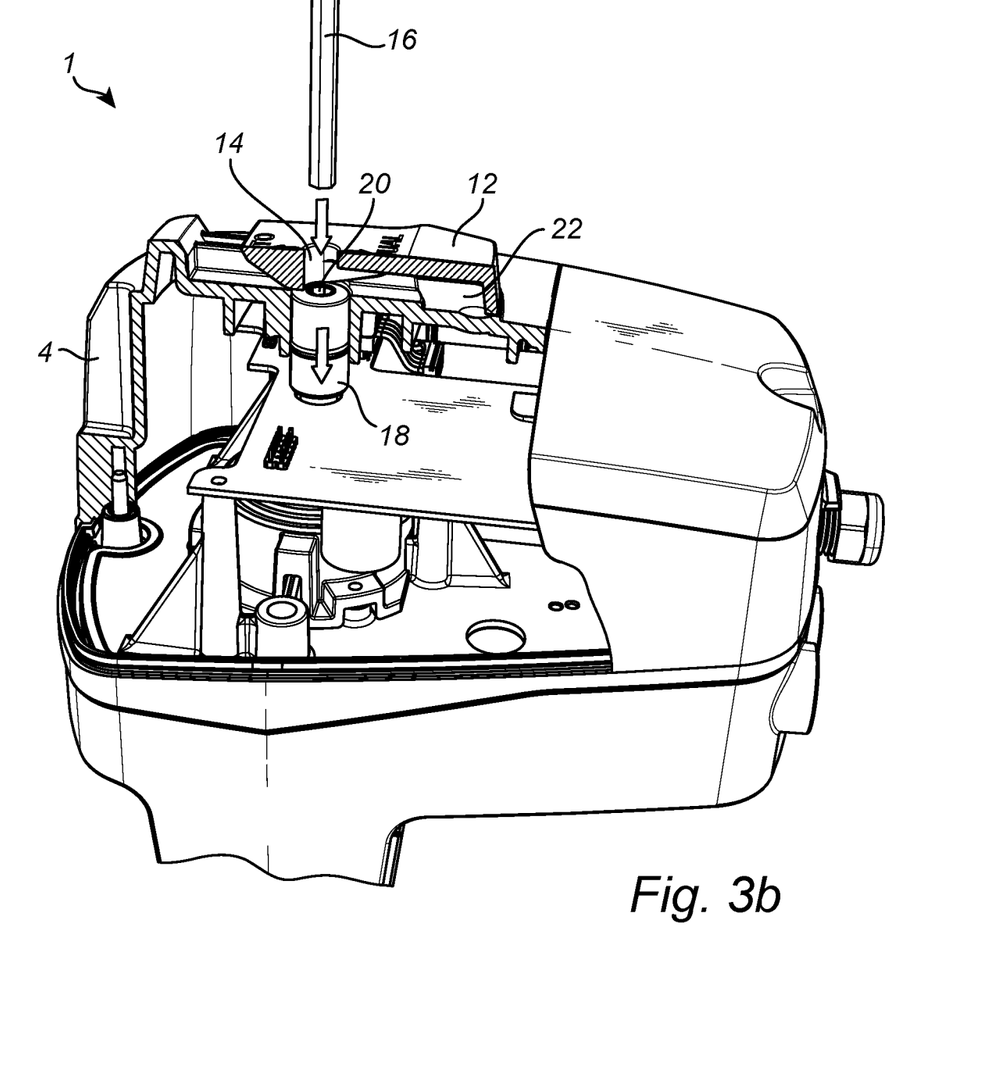
FIG. 3b is a detailed view of said parts of the manual override arrangement in FIG. 3a, the actuator being in manual override operating mode.

The actuator in FIGS. 1a-1b comprises a manual override arrangement 10 allowing an operator to manually manoeuvre the actuator spindle 3. The manual override arrangement 10 comprises a protecting first element 12 being arranged at least partly outside of the housing 4 and having a through hole 14 for receiving a tool 16, and a tool-receiving second element 18 arranged adjacent to the protecting element 12, the tool-receiving element 18 comprises a receiving hole 20 for receiving the tool 16. As can be seen in FIGS. 1b, 3b and 4b the tool 16 is used when the actuator 1 is in the manual override operating mode. The tool-receiving element 18 is operatively connected to the actuator spindle 3 via an intermediate element 50, a clutch arrangement 60 and an actuator spindle holder 70. The manual override arrangement 10 further comprises a locking element 80 which is arranged to lock the actuator spindle holder 70 in position during normal operating mode.

As best seen in FIG. 1b, in particular the enlarged detailed view of the locking element 80 and the actuator spindle holder 70, the locking element 80 has a first engaging portion displaying a first set of teeth 82 which project axially in a direction towards the actuator spindle holder 70. The actuator spindle holder 70 has a second engaging portion displaying a second set of teeth 72 which project axially in a direction towards the locking element. The first set of teeth 82 and the second set of teeth 72 are adapted to mesh in with each other in the normal operating mode to lock the actuator spindle holder 70 and prevent rotational movement of the actuator spindle holder 70. Thus, the second engaging portion is adapted to engage with said first engaging portion, such that when said first engaging portion engages with said second engaging portion said actuator spindle holder 70 is locked to said locking element 80. The engaging portions are thus located at respective surfaces which extend perpendicularly to the actuator spindle axis. Although the engaging portions with the teeth 72, 82 are illustrated as being located on an upper/outer surface of the actuator spindle holder 70 and a lower/inner surface of the locking element 80, other configurations are also possible. For instance, instead of axially protruding teeth, it would be conceivable to have radially protruding mutually matching teeth. Furthermore, instead of teeth, other means to prevent axial rotation of the actuator spindle holder 70 are conceivable. One such example, is a polygonal outer surface of the actuator spindle holder 70 being rotationally lockable to a mating polygonal inner surface of the locking element 80.

At the protecting element 12, the housing 4 is curved and forms a space 22 together with an L-shaped portion of the protecting element 12, in the space 22 the protecting element 12 and the tool-receiving element 18 are adapted to engage with each other. In other words the space 22 is formed between at least a part of an outer surface of the housing 4 and at least a part of an inner surface of the protecting element 12. In normal operating mode (FIGS. 1*a* and 3*a*), a top portion 24 of the tool-receiving element 18 extends into the space 22. The protecting element 12 comprises a bevelled surface 26 facing the space 22 and at least partly facing the tool-receiving element 18, or more precisely at least partly facing the top portion 24 of the tool-receiving element 18.

The normal operating mode and the manual override operating mode of the actuator 1 will now be described in more detail. First, the normal operating mode will be described and after that, the manual override operating mode will be described.

Figure 2:
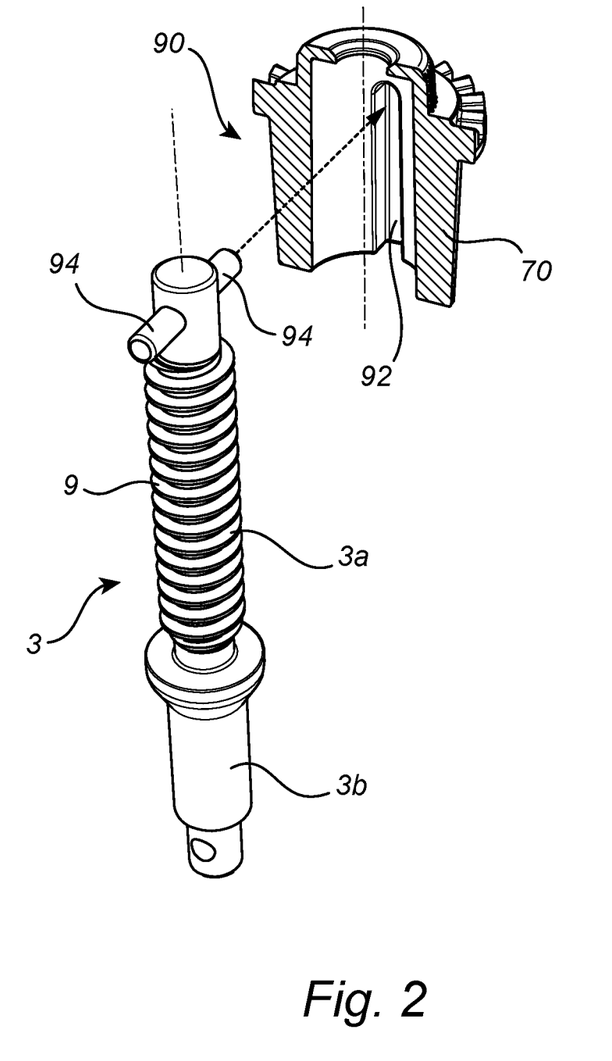
FIG. 2 is a detailed view illustrating the cooperation between an actuator spindle and an actuator spindle holder in accordance with at least one example embodiment of the invention.

As best seen in FIG. 2, the actuator 1 further comprises a guiding arrangement 90 for guiding the actuator spindle 3 inside the actuator spindle holder 70. The guiding arrangement 90 comprises first guiding means 92 comprised in the actuator spindle holder 70 and second guiding means 94 comprised in the actuator spindle 3. In FIGS. 1*a*, 1*b* and 2, the first guiding means 92 is illustrated as elongated grooves 92 provided in an inner surface of the actuator spindle holder 70. In the cut-away views only one elongated groove 92 is visible, the other one being located opposite to the first one on the inner surface of the actuator spindle holder. The elongated grooves 92 have a main extension in the axial direction of the actuator 1. The second guiding means 94 is illustrated as two pins 94 provided on an outer surface of the actuator spindle 3, the pins 94 are adapted to protrude radially into the respective elongated groove 92 in order to guide the actuator spindle 3 in the axial direction in the normal operating mode.

The reciprocal movement of the actuator spindle 3 is typically transferred to a reciprocal movement of a valve rod to which it is operatively connected to, in order to control the valve rod and the opening or closing of the valve. It should be understood that the actuator spindle 3 may be moved towards and away from the valve to which it is connected to in order to close or open the valve respectively.

Furthermore, in the normal operating mode, a tool 16 is prevented from engaging with the receiving hole 20 of the tool-receiving element 18 by a blocking wall portion 28 of the protecting element 12. In other words, the arrangement of the protecting element 12 in the normal operating mode ensures that the through hole 14 of the protecting element 12 is unaligned with the receiving hole 20 of the tool-receiving element 18. Hereby, the operator is prevented from manually operating the actuator 1 without undertaking an action to move the protecting element 12 and thereby align the through hole 14 with the receiving hole 20. Furthermore, the protecting element 12 and the wall blocking portion 28 of the protecting element 12 reduces the risk of having particles and debris entering the actuator 1 in the normal operating mode.

In case of loss of grid, or e.g. before the actuator 1 has been connected to the grid during e.g. installation of the actuator 1 to the valve, or due to malfunction of one or more components used during normal operating mode (e.g. malfunctioning of the motor or the gear arrangement) the manual override operating mode may be used. In the manual override operating mode, it is assumed that the motor is unable to drive the actuator spindle 3.

In FIGS. 1*b*, 3*b* and 4*b*, the actuator 1 is set in the manual override operating mode. Here the manual override arrangement 10 allows for an operator to manually manoeuvre the actuator spindle 3. As compared to FIGS. 1*a*, 3*a* and 4*a*, the protecting element 12 has been moved, e.g. by a slideable movement, such that the bevelled surface 26 of the protecting element 12 has been moved inside the space 22 and now engages with the tool-receiving element 18 via the top portion 24 of the tool-receiving element 18. The tool-receiving element 18 has thereby been pushed in the axial direction by the protecting element 12 and its bevelled surface 26 towards the actuator spindle 3 and has now moved further into the housing 4 of the actuator 1 and outside of the space 22, as can be seen in FIGS. 1*b* and 3*b*.

As shown in FIG. 1*b*, the intermediate element 50 and the actuator spindle holder 70 have also been moved in the axial direction further away from the space 22 as compared to in FIG. 1*a* as a consequence of that the tool-receiving element 18 is connected to actuator spindle holder 70 via the intermediate element 50. Thus, in FIG. 1*b*, the actuator spindle holder 70 is not rotationally locked (as compared to in FIG. 1*a*) to the locking element 80 as the teeth 72 of the actuator spindle holder 70 have been axially separated from the teeth 82 of the locking element 80, i.e. the first and second engaging portions of the locking arrangement have become separated from their mutually engaged position. Hereby, the actuator spindle holder 70 may be moved in a direction being perpendicular to the axial direction. In particular, the actuator spindle holder 70 may now be rotated around its central axis.

The actuator further comprises a spring element 86 biased to press the teeth 72 of the actuator spindle holder 70 towards the teeth 82 of the locking element 80. The locking element 80 is provided internally of the housing 4 of the actuator 1, and is fixedly attached to a fundament or a base portion 88 inside said housing 4. The spring element 86 is provided between the base portion 88 and the actuator spindle holder 70. When the protecting element 12 is moved so that the tool-receiving element 18 and therefore the actuator spindle holder 70 is axially displaced, the biasing force of the spring element 86 is overcome and the actuator spindle holder 70 is released from the locking element 18 and the rotationally locked position. Thus, by overcoming the biasing force of the spring element 86, the manual override operating mode is obtained.

As compared to FIG. 1*a*, where the through hole 14 of the protecting element 12 is unaligned with the receiving hole 20 of the tool-receiving element 18 and thereby prevents a tool 16 from engaging with the tool-receiving element 18, in FIG. 1*b* the protecting element 12 has been moved such that the through hole 14 and the receiving hole 20 are aligned.

Hereby a tool 16 may be inserted into the actuator 1 via the through hole 14 and into the receiving hole 20 such that the tool-receiving element 18 may be manually operated by the tool 16. Preferably, the receiving hole 20 has a non-circular cross section, e.g. a hexagonal cross section, and preferably, the tool 16 has a matching non-circular cross section, e.g. a hexagonal cross section. Hereby, a rotational movement of the tool 16, when the tool 16 is located inside the receiving hole 20, will result in a rotational movement of the tool-receiving element 18. The tool may e.g. be a hex-key or an Allen-key.

By rotating the tool-receiving element 18 with the tool 16, the intermediate element 50 will rotate accordingly as it is rotatably connected/attached to the tool-receiving element 18. Depending on the reluctance of the actuator spindle holder to be rotated (e.g. due to that the actuator spindle 3 has pushed the valve rod into the closed position of the valve), and depending on the clutch arrangement 60, the rotational movement of the intermediate element 50 will be further transferred to the actuator spindle holder 70 and the actuator spindle 3.

As shown in FIGS. 1a, 1b, 4a and 4b, the clutch arrangement 60 is arranged between the intermediate element 50 and the actuator spindle holder 70. The clutch arrangement 60 comprises a clutch spring 62, first clutch engaging portion 64 (see the separate enlarged detailed view of the intermediate element 50 in FIG. 4b) comprised in an inner surface of the intermediate element 50, and second clutch engaging portion 66 comprised in an outer surface of the actuator spindle holder 70. The first and the second clutch engaging portions 64, 66 are arranged to engage which each other, and the clutch spring 62 is arranged to press the first clutch engaging portion 64 towards the second clutch engaging portion 66. The clutch arrangement 60 may e.g. be designed so that rotational movement of the intermediate element 50 is only transferred to the actuator spindle holder 70 up to a certain threshold force. For example, if the actuator spindle 3 has pushed the valve rod into a valve seat of the valve (i.e. to a closed position of the valve), it is not desirable to further move the actuator spindle 3 towards the valve as this may damage components in the valve (e.g. the valve plug or the valve seat) and/or the actuator 1 (e.g. the actuator spindle holder 70 or the actuator spindle 3). Thus, the clutch arrangement 60, and more specifically the clutch spring 62, is preferably adapted in such a way that when the threshold force is reached, the clutch spring deflects whereby the first and second clutch engaging portions 64, 66 disengage and no rotational movement is allowed to be transferred from the intermediate element 50 to the actuator spindle holder 70. In other words, the clutch arrangement 60 may be referred to as an overload-protected clutch arrangement 60.

However, in one example embodiment, the clutch arrangement 60 may further comprise a spacer element 51 and a biasing spring 52, arranged between the intermediate element 50 and the actuator spindle holder 70, as indicated in the dashed box 100. The spacer element 51 is provided with an outer clutch engaging portion 53 for engaging the first clutch engaging portion 64 of the intermediate element 50, and an inner clutch engaging portion (not shown) for engaging the second clutch engaging portion 66 arranged on an outer surface of the actuator spindle holder 70. The actuator spindle holder 70 may accordingly be slightly structurally modified by providing supporting surfaces to ensure that the biasing spring 52 is secured in a desired position. For example by having an axially extending cylindrical support structure on a top surface of the actuator spindle holder 70 where the biasing spring 52 is arranged about the axially extending cylindrical support structure.

The spacer element 51 acts as an additional gear which together with the biasing spring 52 facilitates the return of the clutch arrangement 60 and other gears or components of the manual override arrangement 10 back to their original position, i.e. in position for the normal operating mode, and thereby reducing the risk of having sticking issues when changing operating modes. Provided that the rotational movement from the intermediate element 50 is transferred to the actuator spindle holder 70 via the clutch arrangement 60 (i.e. provided that the threshold force is not reached), the actuator spindle holder 70 will rotate together with the actuator spindle 3 as an inner surface of the elongated grooves 92 of the actuator spindle holder 70 will act on the pins 94 of the actuator spindle 3, and thereby transfer the rotational movement of the actuator spindle holder 70 to the actuator spindle 3. Hereby the actuator spindle 3 will rotate.

It should be understood from the above that the actuator spindle 3 moves differently depending on if it is driven by the motor via the main gear wheel 5 in the normal operating mode or by a tool 16 in the manual override operating mode. In the normal operating mode, the actuator spindle 3 moves reciprocally, i.e. up and down, in the axial direction without being rotated (as the main gear wheel 5 rotates clockwise or counter-clockwise while being locked in its axial position). In the manual override operating mode, the actuator spindle 3 is rotated by the tool 16 (via the tool-receiving element 18, the intermediate element 50, the clutch arrangement 60 and the actuator spindle holder 70) and the internally arranged thread of the main gear wheel 5 engages with the externally arranged matching thread 9 of the actuator spindle 3 which allows the actuator spindle 3 to be moved internally of the main gear wheel 5 in the axial direction.

However, as the valve rod is typically moved reciprocally in order to control the opening and closing of the valve, i.e. independently of whether the actuator 1 is operated in the manual operating mode or in the manual override operating mode, a rotational adjustment means transferring the rotational movement of the actuator spindle 3 (in the manual override operating mode) into a reciprocal movement of the valve rod is typically used. Such rotational adjustment means may be accomplished in various ways. For instance, with reference to FIG. 2, the actuator spindle 3 may have a first spindle part 3a and a second spindle part 3b. The first spindle part 3a may be only axially but not rotationally locked to the second spindle part 3b. The second spindle part 3b is rotationally locked relative to the housing 4. For instance the second spindle part 3b may have an internal compartment in which a flange (not shown) of the first spindle part 3a may rotate. Thus, regardless of if the first spindle part 3a is only moved axially (normal operating mode) or is rotated and axially moved (manual override operating mode), the second spindle part 3b will only perform an axial movement and no rotational movement.

In other example embodiments, with reference to FIG. 2, the first actuator spindle part 3a and the second actuator spindle part 3b may be made in one piece or at least non-rotatably connected to each other. In such case a rotational adjustment means may be provided, for instance, as follows. The second actuator spindle part 3b, or at least a portion of it may extend into a coupling housing (not shown) having its opposite end connectable to the valve rod. The coupling housing is rotationally locked, but can move axially, e.g. along guide rails or the like. In the coupling housing a load bush may be provided, which is rotatable within the coupling housing. An end portion of the second actuator spindle part 3*b* may be connected to the load bush e.g. by means of a connecting pin (in FIG. 2*a* circle is illustrated at the lower end portion of the second actuator spindle part 3*b*, and at this circle a pin could be provided and connected to the load bush). Thus, in manual override operating mode, the actuator spindle 3 rotates and is rigidly connected to the load bush within the coupling housing. As described above in this application, in manual override operating mode the rotation of the actuator spindle 3 will due to its thread 9 advance the actuator spindle axially. Since the connected load bush will rotate with the actuator spindle 3, and in particular rotate within the rotationally fixed coupling housing, only the axial advancement (or withdrawal) of the actuator spindle will be transmitted to the coupling housing, and thus to a valve rod connected to the coupling housing.

According to at least one example embodiment, the protecting element 12 and the tool-receiving element 18 may be referred to as a tool receiving arrangement. However, according to at least one example embodiment, the protecting element 12 may be omitted.

The invention claimed is:

1. An actuator for controlling a valve having a valve rod, said actuator comprising:
   a housing;
   an actuator spindle arranged at least partly inside said housing, said actuator spindle being arranged to control the movement of the valve rod;
   a manual override arrangement for manually moving said actuator spindle, said manual override arrangement comprising:
      a locking element,
      an actuator spindle holder housing at least a portion of said actuator spindle, and
      a locking arrangement having a first engaging portion comprised in said locking element and a second engaging portion comprised in said actuator spindle holder, said second engaging portion being arranged to engage with said first engaging portion,
   a guiding arrangement for guiding the actuator spindle, said guiding arrangement having first guiding means comprised in said actuator spindle holder, and second guiding means comprised in said actuator spindle,
   such that in a normal operating mode of said actuator, said first engaging portion engages with said second engaging portion whereby said actuator spindle holder is locked to said locking element, and said actuator spindle is axially guidable along said actuator spindle holder via said guiding arrangement and said actuator spindle is movable in the normal operating mode, wherein the guidance of the actuator spindle along the actuator spindle holder is translational;
   wherein in a manual override operating mode, said second engaging portion is disengaged from said first engaging portion whereby said actuator spindle holder is unlocked from said locking element, and said actuator spindle holder is rotatable together with said actuator spindle via said guiding arrangement.

2. An actuator according to claim 1, wherein said first engaging portion comprised in said locking element comprises teeth, and wherein said second engaging portion comprised in said actuator spindle holder comprises matching teeth.

3. An actuator according to claim 2, wherein said guiding arrangement comprises:
   an elongated groove provided in an inner surface of said actuator spindle holder, and
   a pin provided on an outer surface of said actuator spindle, said pin being adapted to protrude into said elongated groove in order to guide said actuator spindle along said elongated groove.

4. An actuator according to claim 1, wherein said guiding arrangement comprises a male-female coupling.

5. An actuator according to claim 1, comprising a spring element arranged to press said second engaging portion comprised in said actuator spindle holder towards said first engaging portion comprised in said locking element.

6. An actuator according to claim 5, comprising a base portion provided at least partly inside of said housing, wherein said locking element is attached to said base portion inside said housing, wherein said spring element is provided between said base portion and said actuator spindle holder.

7. An actuator according to claim 1, wherein the actuator spindle has a main extension in an axial direction, and wherein said first engaging portion comprised in said locking element is arranged on a surface being perpendicular to said axial direction, and said second engaging portion comprised in said actuator spindle holder is arranged on a surface being perpendicular to said axial direction.

8. An actuator according to claim 1, wherein said manual override arrangement further comprises a tool-receiving element adapted to receive a tool, said tool-receiving element being operatively connected to said actuator spindle holder, and in said manual override operating mode, being rotatably movable together with said actuator spindle holder.

9. An actuator according to claim 8, wherein said manual override arrangement further comprises a clutch arrangement arranged between said tool-receiving element and said actuator spindle holder.

10. An actuator according to claim 9, wherein said manual override arrangement further comprises an intermediate element provided between said tool-receiving element and said actuator spindle holder, and wherein said clutch arrangement comprises
    a first clutch engaging portion comprised in an inner surface of said intermediate element, and
    a second clutch engaging portion comprised in an outer surface of said actuator spindle holder.

11. An actuator according to claim 10, further comprising a clutch spring adapted to press said first clutch engaging portion towards said second clutch engaging portion.

12. An actuator according to claim 10, wherein said tool-receiving element is adapted to receive and transfer a rotational movement from the tool to said actuator spindle via said intermediate element, said clutch arrangement and said actuator spindle holder.

13. An actuator according to claim 1, wherein said actuator spindle holder is arranged radially outwardly and co-axially with said actuator spindle.

14. An actuator for controlling a valve having a valve rod, said actuator comprising:
    a housing;
    an actuator spindle arranged at least partly inside said housing, said actuator spindle being arranged to control the movement of the valve rod;
    a manual override arrangement for manually moving said actuator spindle, said manual override arrangement comprising:
       a locking element,
       an actuator spindle holder housing at least a portion of said actuator spindle, and
       a locking arrangement having a first engaging portion comprised in said locking element and a second engaging portion comprised in said actuator spindle holder, said second engaging portion being arranged to engage with said first engaging portion, a guiding arrangement for guiding the actuator spindle, said guiding arrangement having first guiding means comprised in said actuator spindle holder, and second guiding means comprised in said actuator spindle, such that in a normal operating mode of said actuator, said first engaging portion engages with said second engaging portion whereby said actuator spindle holder is locked to said locking element, and said actuator spindle is guidable along said actuator spindle holder via said guiding arrangement and said actuator spindle is movable in the normal operating mode;

wherein in a manual override operating mode, said second engaging portion is disengaged from said first engaging portion whereby said actuator spindle holder is unlocked from said locking element, and said actuator spindle holder is rotatable together with said actuator spindle via said guiding arrangement, wherein said locking element is arranged radially outwardly and co-axially with said actuator spindle holder.

15. An actuator according to claim 1, further comprising a main drive gear having a through hole with an internal thread, wherein said actuator spindle comprises a matching external thread and is adapted to be guided in and along said through hole of the main drive gear.

16. An actuator for controlling a valve having a valve rod, said actuator comprising:
a housing;
an actuator spindle arranged at least partly inside said housing, said actuator spindle being arranged to control the movement of the valve rod;
a manual override arrangement for manually moving said actuator spindle, said manual override arrangement comprising:
a locking element,
an actuator spindle holder housing at least a portion of said actuator spindle, and
a locking arrangement having a first engaging portion comprised in said locking element and a second engaging portion comprised in said actuator spindle holder, said second engaging portion being arranged to engage with said first engaging portion,
a guiding arrangement for guiding the actuator spindle, said guiding arrangement having first guiding means comprised in said actuator spindle holder, and second guiding means comprised in said actuator spindle,
such that in a normal operating mode of said actuator, said first engaging portion engages with said second engaging portion whereby said actuator spindle holder is locked to said locking element, and said actuator spindle is guidable along said actuator spindle holder via said guiding arrangement, and wherein the locking element prevents rotation of the actuator spindle holder when the respective first and second engaging portions thereof are engaged, and said actuator spindle is movable in the normal operating mode;
wherein in a manual override operating mode, said second engaging portion is disengaged from said first engaging portion whereby said actuator spindle holder is unlocked from said locking element, and said actuator spindle holder is rotatable together with said actuator spindle via said guiding arrangement.

* * * * *